Sept. 18, 1973   E. M. HORAK   3,759,702

METHOD OF MELTING ALUMINUM

Filed April 7, 1971   2 Sheets-Sheet 1

INVENTOR:
EDWIN M. HORAK
BY
Macey, Kolehmainen, Rathbury & Wyss
ATT'YS

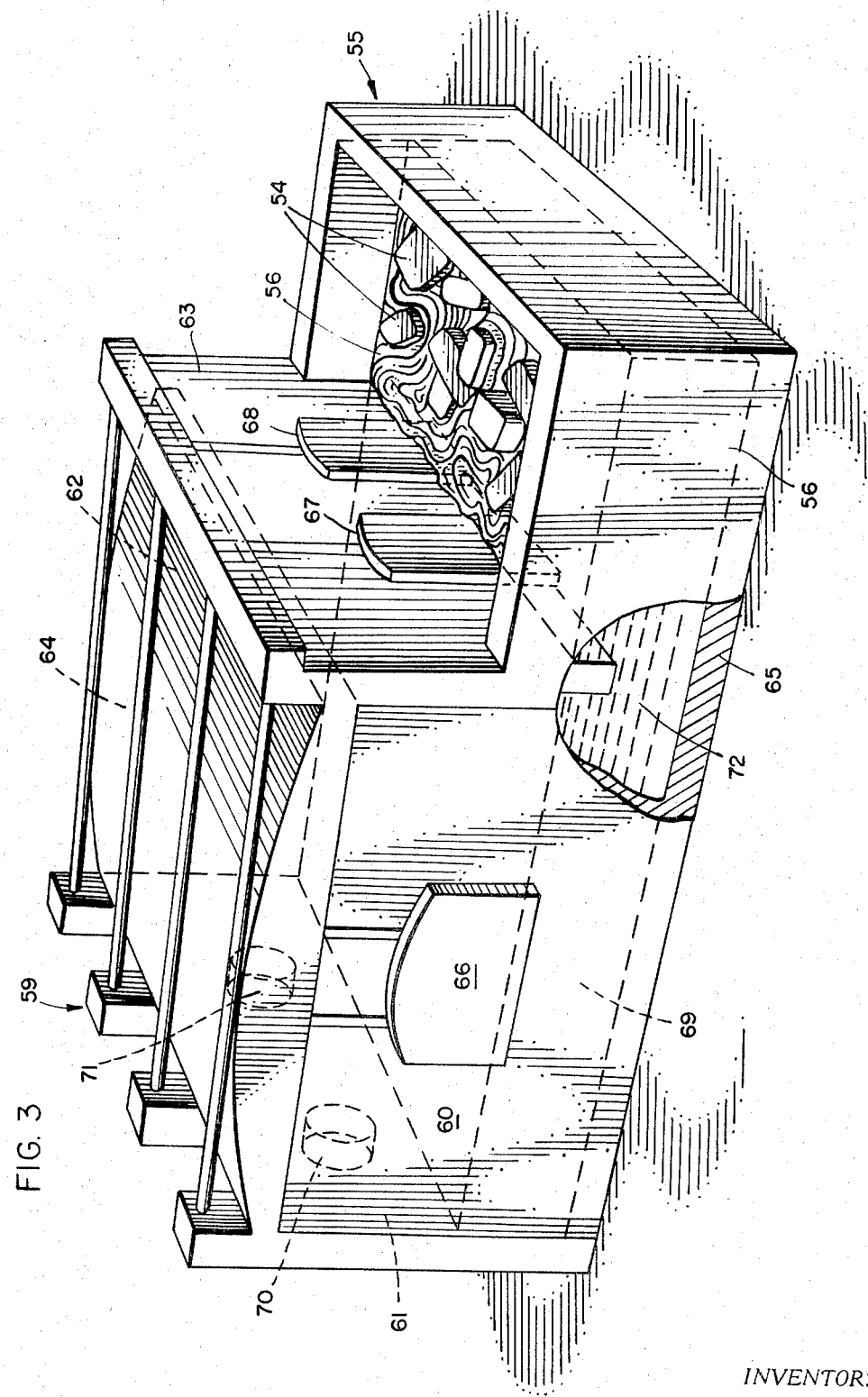

3,759,702
METHOD OF MELTING ALUMINUM
Edwin M. Horak, Skokie, Ill., assignor to Chemetron Corporation, Chicago, Ill.
Continuation-in-part of application Ser. No. 17,340, Mar. 6, 1970, which is a continuation of application Ser. No. 545,946, Apr. 28, 1966, both now abandoned. This application Apr. 7, 1971, Ser. No. 132,142
Int. Cl. C22b 7/00, 21/00
U.S. Cl. 75—63        5 Claims

ABSTRACT OF THE DISCLOSURE

Method of producing aluminum alloy from scrap aluminum which comprises melting aluminum scrap in a forehearth in an unconfined atmosphere with a nonoxidizing oxy-fuel flame, retaining the melt in a furnace, adjusting the composition of the metal in the furnace to produce an aluminum alloy, and withdrawing substantially all of the aluminum alloy from the furnace.

---

This invention relates to a method of melting aluminum, particularly aluminum scrap, in a furnace forehearth. More particularly, this invention relates to a method of increasing the aluminum scrap melting rate by use of a fluid fuel-oxygen burner in an unconfined atmosphere outside of the furnace. More specifically, this invention relates to a process for recovering aluminum from scrap which comprises melting scrap in a forehearth with a nonoxidizing flame, retaining the melt in a furnace, adjusting its composition in the furnace, and withdrawing substantially all of the molten aluminum from the furnace.

CROSS REFERENCE TO RELATED APPLICATION

This application is a continuation-in-part of application Ser. No. 17,340, filed Mar. 6, 1970, and now abandoned, which is a continuation-in-part of application Ser. No. 545,946, filed Apr. 28, 1966, and now abandoned.

BACKGROUND OF THE INVENTION

The use of high purity oxygen to burn fluid fuels such as natural gas and oil in the manufacture of ferrous metals has found wide acceptance. The quantity of oxygen and fuel is usually regulated so that the flame has oxidizing properties, although it is recognized that for some types of scrap a neutral or reducing type flame is preferred.

Production of ferrous metals using oxygen is taught by M. E. Boyd in U.S. 3,115,405 and by E. F. Kurzinski in U.S. 3,194,650. These patents are directed primarily to uses of lances and burners in iron and steel making. Boyd discloses the use of lances located in the wicket holes in the furnace charging doors and also shows burners positioned in the end walls of the furnace. Kurzinski employs a device which serves as both an oxygen lance and a burner and he is aware of the problems concerning refractory linings in furnaces when employing oxy-fluid fuel burners in a furnace. This particular reference thus teaches the use of a dual burner system wherein an air burner is employed to provide a protective atmosphere between the oxygen burner and the refractory wall.

It might be expected that following its extensive use in the steel industry, oxygen would be employed in a similar fashion to burn fuel to melt non-ferrous metals. Quite to the contrary, however, it was widely believed that unsatisfactory results would follow adoption of such a process. More particularly, it was feared that the use of oxygen in the melting of aluminum would cause chemical reactions to occur with explosive violence. It was also thought that the higher temperature of the oxy-fuel flame would produce an economically prohibitive loss of aluminum, which is more volatile and ordinarily far more costly than iron or steel.

Surprisingly, in view of these widely held beliefs, it has now been discovered that according to the process of this invention an oxy-fuel flame may be successfully and safely employed for melting aluminum scrap in an unconfined atmosphere. Heretofore aluminum scrap has been melted in a reverberatory furnace or similar enclosed furnace under the influence of heat produced from a nonoxidizing fluid fuel-air (or oxygen) flame under controlled atmospheric conditions.

The use of oxy-fuel burners to accelerate scrap meltdown in the ferrous industry was established a number of years ago. During the last five years, oxy-fuel burners have been used extensively in the secondary copper and lead industry. The secondary aluminum industry has been slow to adopt the use of burners to accelerate melting. This has been generally due to the limited charging and melting procedures in existence at most plants.

Oxy-fuel burner technology, when applied to scrap melting, requires flame impingement on the scrap pile. In most aluminum scrap-melting operations, the scrap is not charged inside the furnace where melting by flame impingement is accomplished. Instead, metal is charged in an open forehearth and melting is accomplished primarily by washing molten metal against cold scrap, and flame is not applied to solids in the forehearth. The washing may be accomplished by means of a mechanical pump or by rabbling the molten metal with nitrogen injected by means of a lance. Usually 10 to 15 percent of the charge material available is heavy melt, such as sows and ingots. This type of material is ideal for melting with oxygen burners. The balance of the charge is clips, turnings, borings, and various other low density materials from which it is usually difficult to realize a high recovery.

In conventional practice, after all the metal has been charged, melted, and skimmed, it is adjusted chemically and brought up to the proper tapping temperature. Then 75 to 80 percent of the metal is tapped. The remainder, which is called a heel, is left in the furnace to facilitate the melting of the next heat.

One of the objects of this invention is to eliminate the need for a heel through the use of an oxy-natural gas burner.

Another object of the present invention is to provide a method of employing an oxy-fluid fuel burner in a forehearth for producing aluminum from aluminum scrap.

It is another object of the present invention to provide a process for melting aluminum scrap metal in a forehearth which results in high production of the furnace.

Another object is to increase melting rates up to 75 percent by use of an oxy-natural gas burner to melt various types of heavy aluminum scrap in the forehearth.

A further object is an increase in productivity obtained with the oxy-natural gas burner since the heel in the furnace can be virtually eliminated.

Another object is to increase the yield of molten aluminum alloy from scrap.

These and other objects of the present invention will be apparent from the following detailed description, and the drawings, in which:

FIG. 3 is a view, partly in section, of a reverberatory furnace and forehearth.

DESCRIPTION OF THE INVENTION

We have discovered that aluminum scrap can be efficiently melted in the forehearth of a reverberatory furnace with an oxy-fluid fuel burner operating with a slight stiochiometric excess of fuel over oxygen so that a reducing flame is produced. By operating in the forehearth in this fashion, it is possible to increase the daily output of the furnace because all of the metal from each heat which is melted in the forehearth and furnace can be drawn off substantially completely without retaining a heel (usually amounting to 20–25% of the total charge) as has been the previous practice. The oxy-fluid fuel burner operates outside of the furnace without any enclosing structure and still avoids undesirable oxidation of the melting metal which effect heretofore could only be achieved in an enclosed furnace.

In prior practice, it has been customary to charge scrap to a forehearth containing a heel of molten aluminum remaining from the previous heat. The scrap is melted by the heat of the molten heel and the resulting melt of scrap and heel is retained in the furnace where the analysis of the melt is adjusted to proper alloy composition. Then, about 75–80% of the melt in the furnace is withdrawn as aluminum alloy but 20–25% of the melt is retained to aid in the melting of further scrap. This practice is relatively inefficient becasue metal of adjusted alloy composition is consumed in melting scrap rather than providing valuable alloy billets and shapes. Moreover, the recycling of 20–25% of the melt decreases the output of the furnace and increases the cost of the alloy product. By virtue of this invention, the heel of molten aluminum is not required and all of the melt of adjusted alloy composition can be converted directly into alloy billets with an increase in efficiency.

Basically, the novel method of the present invention comprises the charging of a furnace forehearth with solid aluminum scrap metal. Substantially pure oxygen and a fluid fuel such as natural gas are burned in the proper proportions to produce a reducing flame. The flame is directed onto the aluminum scrap by means of a burner assembly which is supported on a movable carriage which will permit heating of the solid metal scrap. The non-oxidizing flame is directed onto the scrap from all positions along a vertical and a horizontal axis so as to selectively heat and melt portions of the solid metal. The burner which affords the selective melting without oxidation of the non-ferrous metal comprises the usual concentrically positioned chambers and nozzle portion for burning oxygen and fluid fuel as well as means to cool the nozzle portion.

Figure 1:
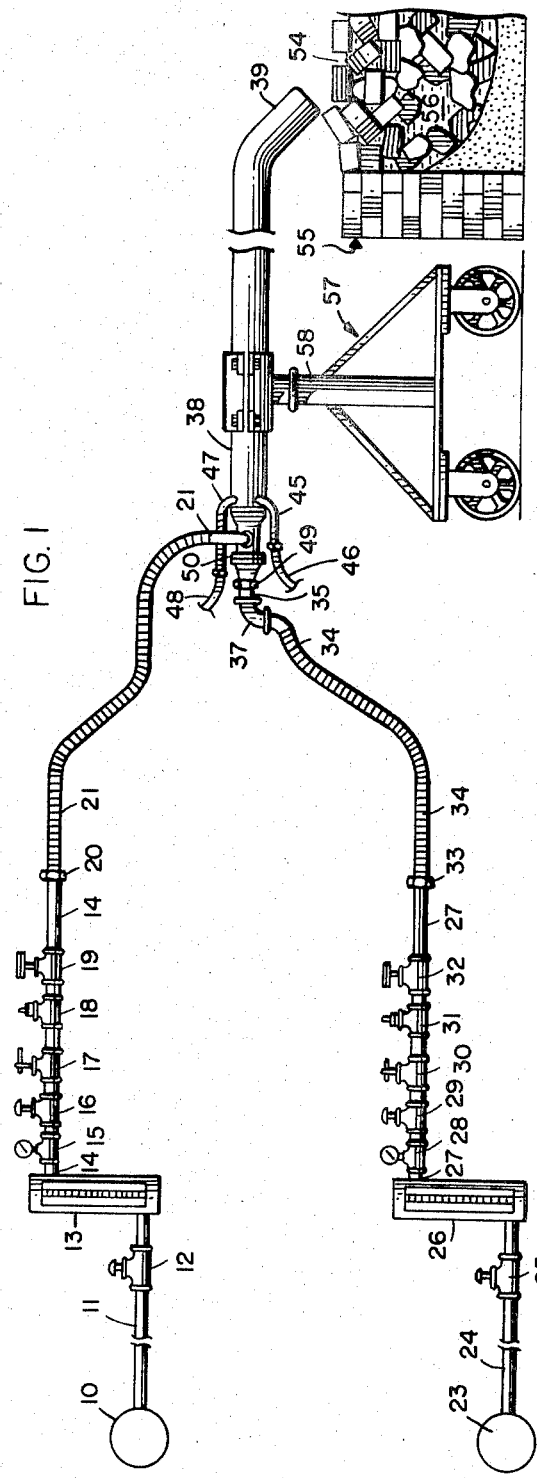
FIG. 1 is a schematic daigram of the oxy-natural gas burner system and forehearth, showing the position of the burner over scrap in the forehearth.

Proceeding to a detailed description of the present invention, a standard furnace forehearth generally 55 is partially shown in FIG. 1. All of the walls are composed of a refractory material and are lined with conventional materials. From a natural gas supply at a convenient pressure (e.g., 20 p.s.i.g.), natural gas (methane) flows through line 11 including a throttle valve 12 for adjusting the rate of flow, and a flow meter 13 indicating the flow rate, then through line 14 including pressure gauge 15, a throttle valve 16, a quick-acting valve 17, a check valve 18, and a bursting disc pressure-relief unit 19, then through the fitting 20 and flexible hose 21 leading to the oxy-natural gas burner 38. Oxygen is supplied from a source 23 through a line 24 and throttle valve 25 via an indicating flow meter 26; then through a lie 27 with pressure gauge 28, throttle valve 9, quick-acting valve 30, check valve 31, and pressure-release device 32 with bursting disc, through fitting 33 and flexible hose 34 connected via fitting 37 and pipe 35 leading to the oxy-natural gas burner 38. The tip 39 of the burner 38 is set at an angle in order to direct the flame into the scrap pile 54 in the forehearth 55. The angle may be about 30° to about 60° with about 45° being preferred. A burner carriage 57 supports the burner on a standard 58 and is so arranged to move the burner 38 over the forehearth 55 to direct the flame to appropriate parts of the scrap 54.

Figure 2:
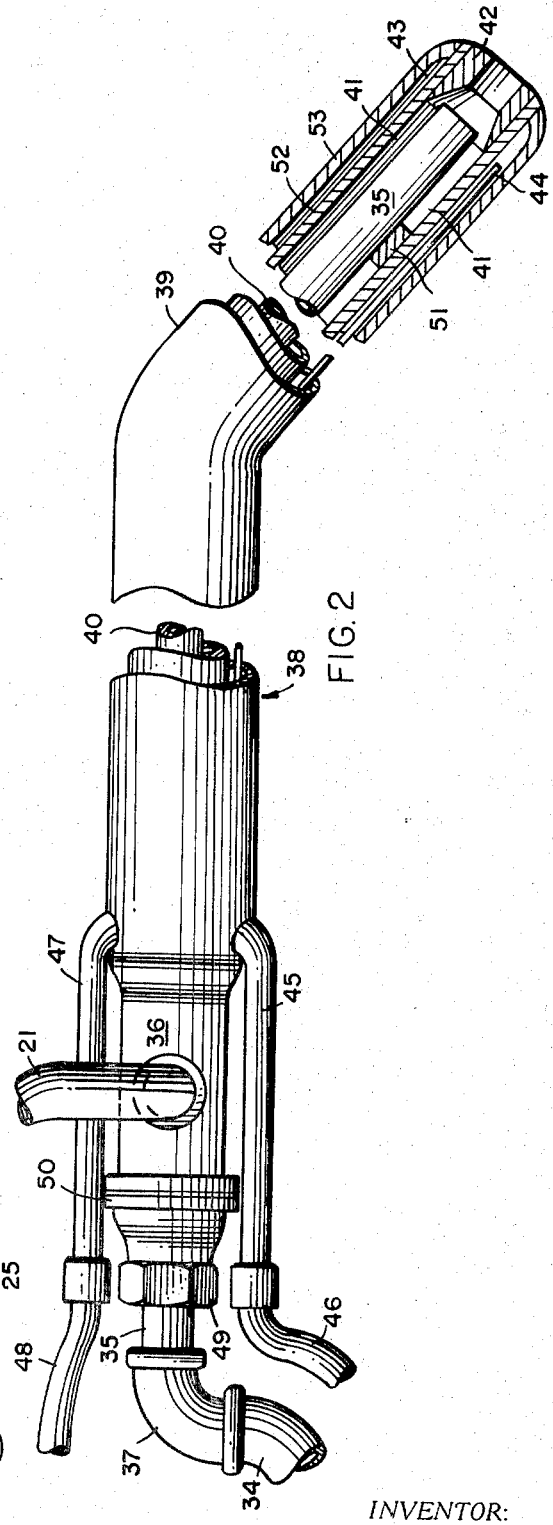
FIG. 2 is a view, partly in section of the type of burner used in this invention.

Referring to FIG. 2, burner assembly 38 includes burner unit 39 with a central oxygen chamber 40, and a concentrically disposed natural gas chamber 41. A reduced diameter nozzle portion 42 affords intermixing of the oxygen and natural gas from the respective chambers as well as giving direction thereto and is cooled by means of a coolant liquid such as water passing through an outer, concentric chamber 43. Cool water is brought directly to nozzle portion 42 by means of a pipe 44 disposed in chamber 43 terminating at the inner end of nozzle portion 42. Supply pipe 45 brings cool water to pipe 44 by means of hose 46. Heated water leaves burner by way of chamber 43, pipe 47 and outlet hose 48. Oxygen is supplied to central chamber 40 formed by pipe 35 by means of hose 34, through suitable connection 37. Pipe 36 communicating with natural gas supply hose 21 is secured in a fluid tight manner to pipe 35 and spaced concentrically therefrom by means of packing nut 49 and flange 50 to form chamber 41. Spacers, such as shonw at 51 maintain pipe 35 in alignment within pipe 52. An outer pipe 53 is suitably sealed over pipe 52 to provide coolant chamber 43.

FIG. 3 illustrates a reverberatory furnace 59, comprising refractory walls 60, 61, 62 and 63, roof 64 and refractory floor 65, adjacent a forhearth 55 which has a common refractory floor 65. The walls 60 and 63 have doors 66, 67 and 68 which can be lifted to provide access to the interior of the furnace for stirring the melt 69 and adding alloy components. Through holes 70 and 71 in wall 61 burners (not shown) are inserted to heat the furnace. The wall 63 does not extend all the way down to the floor 65. Instead there is an opening 72 connecting the forehearth 55 to the furnace through which molten aluminum from the forehearth flows into the enclosed furnace 59.

In the operation of the novel process of the present invention in the furnace forehearth as shown in FIG. 1, aluminum scrap 54 is formed in a pile at the approximate center of forehearth 55. After a suitable amount of scrap is added, burner assembly 38 is moved into position over the scrap. The fluid fuel is turned on and ignited in the presence of air in burner unit 39 and subsequently oxygen is introduced through chamber 35 increasing the flame temperature 1000–1500° F. higher than burner flames using air. Care is taken that the flame is of a reducing character. In the instance of natural gas burner unit 38 this is aided by the fact that the oxygen stream flows concentrically within the natural gas stream and further by the fact that the oxygen to natural gas ratio is in the order of 1.6:1 to 1.9:1, preferably 1.75:1 to 1.85:1. The ignited oxy-fluid fuel stream is directed to all angles on the scrap pile 54 to melt selected portions of the metal. The selective melting is important because overheating is avoided by having the oxy-fluid fuel flame contact only those areas of scrap where the heat is actually required, thus diminishing the actual use time of the oxy-fluid fuel flame. Also, as sometimes happens, scrap will become piled or bridged with one piece of scrap holding several others. Thus, it is desirable to melt this particular piece of scrap causing the remaining portion of the pile to fall into the molten metal 56 and melt. As the scrap is melted, the melt flows into the reverberatory furnace for alloying and the scrap melting process is repeated.

Through the use of the present process, it has been found that the charge and melt-down time as well as fuel consumption in furnaces producing aluminum alloys from scrap can be reduced by 40-50%. This permits a 20% increase in production in large capacity furnaces. In small furnaces used to melt but not refine aluminum, greater increases in production are effected, up to 25-30%, because no time is spent refining. The increase in production obtained by the use of the manipulatable oxy-fluid fuel burner makes it possible for three furnaces to perform the job of four furnaces.

As the oxy-fluid fuel flame is shorter than an air-fluid fuel flame, the movable burner assembly offers the advantage of positioning burner units closer to the scrap piles.

It will thus be seen that there is now provided a novel process and apparatus for producing aluminum from scrap which results in high furnace capacities and metal recovery never before realized in the industry. This is accomplished by a process which is simple to employ and by a novel apparatus which is simple in design, easily constructed and readily adaptable to conventional furnaces.

Natural gas (particularly methane) has been described as a preferred fluid fuel for burning with oxygen. However, other fluid fuels such as fuel oil or pulverized coal can also be used.

Others may practice the invention in any of the numerous ways which will be suggested by this disclosure to one skilled in the art by employing one or more of the novel features disclosed or equivalents thereof. All such practice of the invention is considered to be part hereof provided it falls within the scope of the appended claims.

The invention is disclosed in further detail by the following examples of test heats conducted in the forehearth of a commercial furnace. This furnace had an 80,000-pound capacity. The inside dimensions of the furnace were 10 feet wide, 20 feet long, and 8 feet high. The forehearth was 10 feet by 4 feet. The normal heat input was supplied by two air-natural gas burners with a nominal combined firing rate of $12 \times 10^6$ B.t.u./hour.

The heat cycle was 24 hours. Charging and melting took about 16 hours. Another 4 hours were used for refining and 4 more hours to pour off 30 tons of metal. A 10-ton heel was left to start the next heat. To facilitate melting, mechanical pumps were used to pump molten metal from the inside of the furnace to the forehearth in order to erode the cold charge material. It was necessary for the molten metal temperature to be 1200° F. before the pumps could be used. Pouring temperatures were slightly over 1400° F.

Oxygen was stored in a 65,000-cubic foot liquid oxygen converter. Vaporization of the liquid oxygen was by electrical means originally. As tests progressed, additional atmospheric vaporization equipment was added. Natural gas was available at 20 pounds of pressure. Both gases were metered by indicating flowmeters.

The burner was specifically designed for this melting application. In order to direct the flame into the scrap pile, a 45-degree angle nozzle tip was designed into the burner. Provision was made for water cooling but was never required during the tests.

A 24-hour bellows meter measured the regular furnace burner's firing rate. Continuous measurement of the molten metal temperature in the forehearth was also monitored.

Tests were conducted on several heats; however, in all cases, the burner was used on limited quantities of scrap. Metal scrap melted in the forehearth varied from 7438 pounds to 31,443 pounds. Molten metal in the furnace, when each test began, varied from none to 45,000 pounds. A normal heel is about 20,000 pounds. Scrap was charged into the forehearth; then the oxy-natural gas burner was turned on. The burner was moved as needed to direct the flame against the scrap pile. When the scrap pile was sufficiently melted, the burner was shut off. At that point, the rest of the metal was put under cover and melted. The bath was then skimmed for dross. Melting rate was determined by dividing the total metal charged during this period by the difference in time between start charge and finish skim.

Recovery was calculated for each charge item based on material skimmed after each charging period. In all cases, the molten metal pump was used as soon as the temperature reached 1200° F. and there was sufficient metal in the bath to reach the bottom of the pump.

The data collected in the eight test heats in a furnace and forehearth of 80,000-lb. capacity are set forth in Table I. In this furnace a 20,000-lb. heel is conventional. The tests were designed to increase the melting rate, particularly at the start of a heat with a small heel or no heel. The first three heats with normal heels show increased melting rates, and therefore increased production rates. The sixth and seventh heats were made with heels one-half normal size and still showed increased melting rates. The fourth melt was made with no heel and showed good melting rate. The eighth heat was made with baled clips, a difficult type of scrap to melt, and an excellent melting rate was achieved. The data in the table indicate that it is possible to increase the melting rate, and hence the production rate, by decreasing the heel size and by melting the scrap in the forehearth open to the atmosphere with a nonoxidizing oxy-fuel flame.

Heat No. 3-901

Since this was the first test, several minutes were lost early in the test period, while burner adjustments were made. This test was conducted by charging 2000 pounds of dishes as a cushion into a normal metal heel of 20,000 pounds and then adding heavy solids. The oxygen burner was fired at $4.4 \times 10^6$ B.t.u./hour and was off only when additional charging was required. This type of heavy

TABLE I

[Melting of aluminum scrap in forehearth of secondary aluminum reverberatory furnace with oxygen-natural gas burner]

| Heat number | 3-901 | 2-902-1 | 3-905 | 3-906 | 3-915 | 3-916 | 3-917-1 | 3-917-3 |
|---|---|---|---|---|---|---|---|---|
| Metal charged to forehearth (lbs.) | 22,787 | 14,359 | 23,496 | 31,443 | 12,946 | 31,456 | 28,920 | 7,438 |
| Molten metal heel (lbs.) | 20,000 | 20,000 | 20,000 | None | 24,000 | 10,000 | 10,000 | 45,000 |
| Time to finish of skim (hours) | 3.66 | 2.33 | 4.7 | 5.87 | 2.4 | 3.93 | 3.4 | 0.85 |
| Forehearth melting rate (lbs./hr.) | 6,226 | 6,163 | 4,999 | 5,357 | 5,394 | 8,004 | 8,506 | 8,751 |
| Recovery (percent) | a 98.76 / b 99.71 | a 96.13 / b 97.81 | c 97.40 / d 98.38 | b 98.03 | e 94.74 / f 94.44 | g 97.51 | a 97.67 | h 99.97 |
| Maximum furnace burner firing rate (million BTU/hr.) | 10.5 | 10.5 | 10.5 | 10.5 | 10.5 | 12.0 | 12.0 | 12.0 |
| Average forehearth burner firing rate (million B.t.u./hr.) | 4.4 | 4.7 | 4.7 | 4.3 | 4.4 | 5.3 | 6.2 | 4.4 |
| Forehearth burner time (minutes) | 106 | 80 | 173 | 252 | 60 | 147 | 123 | 18 |
| Oxygen consumed (cu. ft.) | 13,672 | 11,262 | 24,186 | 32,624 | 7,929 | 23,265 | 22,779 | 2,376 |
| Natural gas consumed (cu. ft.) | 7,738 | 6,230 | 13,379 | 18,036 | 4,396 | 12,954 | 12,720 | 1,314 |
| Oxygen: natural gas ratio | 1.77 | 1.81 | 1.81 | 1.81 | 1.81 | 1.80 | 1.79 | 1.81 |
| Oxygen per ton Al melted (cu. ft.) | 1,200 | 569 | 2,059 | 2,075 | 1,225 | 1,479 | 1,575 | 639 |
| Nat. gas per ton Al melted (cu. ft.) | 679 | 868 | 1,139 | 1,147 | 679 | 824 | 880 | 353 | a = Remelted aluminum solids and dishes; b = remelted aluminum solids; c = remelted aluminum sows and castings; d = remelted aluminum sows; e = remelted aluminum bricks and ingots; f = remelted aluminum bricks; g = scrap aluminum remelt and block; h = clean baled aluminum clips.

melt material in a normal heel melts at the rate of 3500 pounds per hour. Using the oxygen burner, the melting rate increased to 6226 pounds per hour. This is an increase of 78 percent. Normal recovery is 93 to 94 percent on this type material. In this test, recovery was about 99 percent.

Heat No. 3–902–1

Less material was charged for this test than was for the previous test, but it was bulkier in size. The melting rate was comparable but oxygen consumption increased. The increase could be attributed to greater flame reflection caused by the larger type of scrap. Recovery was 1 to 3 percent higher than normally expected.

Heat No. 3–905

A cushion of crushed and dried cast totalling 3910 pounds was charged. Five sows, approximately one ton in weight, were then charged and the oxygen burner started. At first it did not appear that melting was progressing. The large sows, with small surface area-to-weight ratios, reflected the high temperature flame. After about 45 minutes, melting took place rapidly. Five more sows were charged. Melting rate was lower than expected due to problems encountered with the oxygen vaporizer. Fifty-five minutes were lost due to this trouble. Even with the problems encountered, final results showed recovery to be slightly above normal and melting rate to be increased. Despite the time lost during the test, results were good and the heat was successful.

Heat No. 3–906

This test was run without using a heel. About 10,000 poundsof reject ingot were charged into the furnace by hand, and 31,000 pounds were melted with the oxygen burner in the forehearth. The reason for the charge inside the furnace was to aid in the formation of a new heel. Material charged into the forehearth was all heavy melt. Reject ingot, small sows, large sows, and slabs were charged respectively. The last material charged was 500-pound sows. Because of the density, the ingot melted nicely. The larger sows were harder to melt.

Recovery was 2 to 3 percent above average and the melting rate in the forehearth was 50 percent above that normally obtained with a heel. Furthermore, the pump could not be used until 3 hours after the test began. Including the metal melted in the furnace, the overall melting rate was increased 100 percent.

Heat No. 3–915

The heel used in this test was larger than normal and the metal pump was used from the start. The regular furnace burners' combined firing rate was increased in this test and all following tests to the normal firing rate of $12 \times 10^6$ B.t.u./hour. It had been reduced on the first four tests. The majority of the charge was clean bricked clips, which melted readily. Melting rate was increased 50 percent and recovery was increased 2.5 percent above normal.

Heat No. 3–916

The heel was reduced to half its normal size, and the oxygen burner firing rate increased from $4.4 \times 10^6$ to $5.3 \times 10^6$ B.t.u./hour. The charge was good, utilizing reject ingot, rectangular remelt blocks and 500-pound sows. The burner flame was not reflected until the 500-pound sows were charged. On the ingot and remelt blocks, the flame worked its way into the crevices between the pieces and melted the material very well. The recovery was above normal and the melting rate increased over 100 percent.

Heat No. 3–917–1

This test duplicated 3–916. The results were nearly identical. Slightly more oxygen was used per ton melted which could be due to the high oxygen burner firing rate or a bad distribution of charge material near the end of the test.

Heat No. 3–917–3

This test followed the last one on the same heat. All the clean baled clips were charged without turning the oxygen burner off. Recovery was almost 100 percent. This compares to an expected recovery of 93 percent. Normally, the melting rate or this material is 5000 pounds per hour. Hence, the oxygen burner increased it 75 percent.

I claim:
1. Method of producing aluminum alloy from scrap aluminum without causing an explosive reaction which comprises:
    (a) melting aluminum scrap in a furnace forehearth with heat generated principally by a nonoxidizing oxy-fuel flame to produce a melt,
    (b) maintaining said forehearth open to the atmosphere,
    (c) retaining the melt in the furnace,
    (d) adjusting the composition of the melt in the furnace to produce an aluminum alloy, and
    (e) withdrawing substantially all of the melted aluminum alloy from the forehearth prior to recharging the forehearth with additional scrap aluminum, whereby the overall melting rate of the aluminum scrap is increased.
2. Method of claim 1 wherein the flame is an oxy-natural gas flame.
3. Method of claim 2 wherein the amount of gas in the burner is stoichiometrically in excess of the amount of oxygen.
4. Method of claim 3 wherein the stoichiometric ratio of oxygen to gas is in the range from 1.6:1 to 1.9:1.
5. Method of claim 1 wherein the oxy-gas flame is directed onto the aluminum scrap from a burner having a tip set at an angle of about 30° to about 60° to the main section of the burner.

References Cited
UNITED STATES PATENTS

| | | | |
|---|---|---|---|
| 3,194,650 | 7/1965 | Kurzinski | 75—43 |
| 3,578,438 | 5/1971 | Iken | 75—43 |
| 3,607,221 | 9/1971 | Kibby | 75—68 |
| 3,202,201 | 8/1965 | Masella | 75—43 |
| 3,447,920 | 6/1969 | Bartu | 75—43 |
| 3,459,867 | 8/1969 | Estes | 13—9 |
| 3,536,478 | 10/1970 | Ankersen | 75—65 |
| 1,629,563 | 5/1927 | Westberg | 75—445 |

L. DEWAYNE RUTLEDGE, Primary Examiner

P. D. ROSENBERG, Assistant Examiner

U.S. Cl. X.R.

75—68